(12) United States Patent
Marbehant

(10) Patent No.: US 12,115,588 B2
(45) Date of Patent: Oct. 15, 2024

(54) CLAMPING DEVICE AND CUTTING TOOL

(71) Applicant: Ceratizit Luxembourg S.a.r.l., Mamer (LU)

(72) Inventor: Jonathan Marbehant, Mamer (LU)

(73) Assignee: CERATIZIT Luxembourg S.a.r.l., Mamer (LU)

(*) Notice: Subject to any disclaimer, the term of this patent is extended or adjusted under 35 U.S.C. 154(b) by 288 days.

(21) Appl. No.: 17/546,129

(22) Filed: Dec. 9, 2021

(65) Prior Publication Data

US 2022/0176464 A1    Jun. 9, 2022

(30) Foreign Application Priority Data

Dec. 9, 2020    (EP) .................................... 20212603

(51) Int. Cl.
| | | |
|---|---|---|
| B23B 27/16 | (2006.01) | |
| B23C 5/22 | (2006.01) | |
| B23Q 11/00 | (2006.01) | |
| B23B 27/10 | (2006.01) | |

(52) U.S. Cl.
CPC ...... *B23B 27/1622* (2013.01); *B23B 27/1662* (2013.01); *B23C 5/22* (2013.01); *B23B 27/10* (2013.01); *B23B 2200/3618* (2013.01); *B23B 2205/04* (2013.01); *B23B 2250/12* (2013.01); *B23C 2210/165* (2013.01); *B23C 2250/12* (2013.01)

(58) Field of Classification Search
CPC ............ B23B 27/1662; B23B 2205/04; B23B 2250/12; B23B 27/10; B23C 5/22; B23C 2210/165; B23C 2250/12
See application file for complete search history.

(56) References Cited

U.S. PATENT DOCUMENTS

| | | | | | |
|---|---|---|---|---|---|
| 2,854,734 | A | * | 10/1958 | Beck ..................... | B23B 27/167 407/107 |
| 3,137,059 | A | * | 6/1964 | Hertel ................. | B23B 27/1651 407/120 |
| 3,280,450 | A | * | 10/1966 | Sirola ................. | B23B 27/1662 407/104 |
| 3,314,126 | A | * | 4/1967 | Stier ................... | B23B 27/1622 407/105 |

(Continued)

FOREIGN PATENT DOCUMENTS

| | | | | |
|---|---|---|---|---|
| DE | 2544877 | A1 | 4/1976 | |
| DE | 2726802 | A * | 12/1977 | ......... B23B 27/1662 |

(Continued)

*Primary Examiner* — Sara Addisu
(74) *Attorney, Agent, or Firm* — Laurence A. Greenberg; Werner H. Stemer; Ralph E. Locher

(57) ABSTRACT

A clamping device is configured to clamp a cutting insert onto a holder of a cutting tool. The clamping device contains a clamping bolt and a locking bolt, wherein the clamping bolt is configured to be inserted into each of the cutting insert and the holder. The locking bolt is configured to be inserted into the holder, such that the locking bolt pre-strains the clamping bolt into clamping the cutting insert onto the holder. The clamping bolt is configured rotatable about a longitudinal clamping axis of the clamping bolt relative to each of the cutting insert and the locking bolt, such that the clamping bolt wedge engages with the locking bolt during a clamping bolt rotation about the longitudinal clamping axis.

12 Claims, 5 Drawing Sheets

(56) References Cited

U.S. PATENT DOCUMENTS

| | | | | | |
|---|---|---|---|---|---|
| 3,393,435 | A | * | 7/1968 | Viellet | B23B 27/1662 407/105 |
| 3,469,296 | A | | 9/1969 | Reeve et al. | |
| 3,491,421 | A | * | 1/1970 | Holloway | B23B 27/1662 407/105 |
| 3,579,776 | A | * | 5/1971 | Mihic | B23B 27/16 407/120 |
| 3,792,516 | A | * | 2/1974 | Mihic | B23B 27/1677 407/105 |
| 3,815,195 | A | * | 6/1974 | McCreery | F16B 21/16 407/105 |
| 3,906,602 | A | * | 9/1975 | Kummer | B23B 27/1662 407/112 |
| 3,973,309 | A | * | 8/1976 | Kummer | B23B 27/1662 407/104 |
| 4,632,593 | A | * | 12/1986 | Stashko | B23B 27/1622 407/104 |
| 6,158,928 | A | * | 12/2000 | Hecht | B23B 27/1622 407/103 |
| 6,773,210 | B2 | * | 8/2004 | Erickson | B23B 27/1677 407/107 |
| 7,063,488 | B2 | * | 6/2006 | Isaksson | B23B 27/1614 407/113 |
| 9,033,621 | B2 | * | 5/2015 | Hecht | B23C 5/08 407/47 |
| 2006/0291965 | A1 | * | 12/2006 | Erickson | B23B 27/1662 407/102 |
| 2007/0086863 | A1 | * | 4/2007 | Tipu | B23B 27/1662 407/104 |
| 2012/0087746 | A1 | * | 4/2012 | Fang | B23C 5/28 407/103 |
| 2013/0017024 | A1 | * | 1/2013 | Hofermann | B23B 27/10 407/11 |
| 2013/0078043 | A1 | * | 3/2013 | Henry | B23B 27/1622 407/11 |
| 2013/0142579 | A1 | * | 6/2013 | Saji | B23B 27/1651 407/77 |
| 2013/0279997 | A1 | * | 10/2013 | Hecht | B23B 27/045 407/105 |
| 2015/0151364 | A1 | * | 6/2015 | Choi | B23C 5/2208 407/120 |
| 2016/0288216 | A1 | * | 10/2016 | Joo | B23B 27/1662 |
| 2019/0160549 | A1 | * | 5/2019 | Amstibovitsky | B23B 27/1666 |
| 2021/0370412 | A1 | * | 12/2021 | Kato | B23B 27/1662 |
| 2023/0082274 | A1 | * | 3/2023 | Buerkle | B23B 29/043 407/107 |

FOREIGN PATENT DOCUMENTS

| | | | | | |
|---|---|---|---|---|---|
| DE | 3612244 | A | * | 10/1986 | B23B 27/1622 |
| DE | 29907621 | U1 | * | 7/1999 | B23B 27/1622 |
| EP | 3868500 | A1 | * | 8/2021 | B23B 27/04 |
| JP | 2006055916 | A | * | 3/2006 | |
| SU | 1289619 | A | * | 2/1987 | B23B 27/1662 |
| WO | 2013042127 | A1 | | 3/2013 | |

* cited by examiner

CLAMPING DEVICE AND CUTTING TOOL

CROSS-REFERENCE TO RELATED APPLICATION

This application claims the priority, under 35 U.S.C. § 119, of European Patent Application EP 20212603.3, filed Dec. 9, 2020; the prior application is herewith incorporated by reference in its entirety.

FIELD AND BACKGROUND OF THE INVENTION

The present invention relates to a clamping device configured to clamp a cutting insert onto a holder of a cutting tool. The clamping device contains a clamping bolt and a locking bolt, wherein the clamping bolt is configured to be inserted into each of the cutting insert and the holder. The locking bolt is configured to be inserted into the holder, such that the locking bolt pre-strains the clamping bolt into clamping the cutting insert onto the holder.

Clamping devices are generally known, as disclosed for example in international patent disclosure WO 2013/042127 A1, corresponding to U.S. Pat. No. 9,033,621. Disadvantageously they require a precise alignment with respect to each of a cutting insert and a holder to secure the cutting insert onto the holder.

A technical problem of the present invention can be seen in providing a clamping device and a cutting tool each providing for a clamping mechanism which clamps the cutting insert securely onto the holder and is easier handle.

This problem is solved by a clamping device according to the independent clamping device claim and a cutting tool according to the independent cutting tool claim. Preferred embodiments are disclosed in the claims, which can be freely combined, the description and the drawing.

An inventive clamping device is configured to clamp a cutting insert onto a holder of a cutting tool, the inventive clamping device contains a clamping bolt and a locking bolt. The clamping bolt is configured to be inserted into each of the cutting insert and the holder. The locking bolt is configured to be inserted into the holder, such that the locking bolt pre-strains the clamping bolt into clamping the cutting insert onto the holder. The clamping bolt is configured rotatable about a longitudinal clamping axis of the clamping bolt relative to each of the cutting insert and the locking bolt, such that the clamping bolt wedge engages with the locking bolt during a clamping bolt rotation about the longitudinal clamping axis and such that the clamping bolt is kept pre-strained during the clamping bolt rotation. Advantageously, the clamping bolt clamps the cutting insert within any rotational position comprised by the range the clamping bolt can be rotated about the longitudinal clamping axis, i.e. a rotational alignment of the clamping bolt with respect to holder and the cutting insert is insofar not required. Further, in that the clamping bolt is kept pre-strained during the clamping bolt rotation allows to design the clamping bolt to comprise a coolant channel which can be rotated jointly with the clamping bolt, such that different parts of the cutting insert can be supplied with coolant from the clamping bolt during the clamping bolt rotation.

During the clamping bolt rotation, the clamping bolt continues to clamp the cutting insert onto the holder because the clamping bolt is kept pre-strained by the locking bolt.

Once the clamping bolt rotation is completed by a given clamping bolt rotation amounting to e.g. at least 45° about the longitudinal clamping axis, the clamping bolt continues to clamp the cutting insert onto the holder.

That the clamping bolt wedge engages with the locking bolt during the clamping bolt rotation about the longitudinal clamping axis is to be understood that the locking bolt holds the clamping bolt axially in place in a manner a wedge holds an object in place, though not restricted to the case of two planar wedges engaging with each other. For example, the wedge engagement can be realized by two conical parts, realized on parts of the locking bolt and the clamping bolt, contacting each other laterally and being twisted with respect to each other, i.e. the actual or imaginary tips of the conical parts point in different directions.

Longitudinal clamping axis is to be understood to be mean an axis running longitudinally, preferably centrally, through the clamping bolt. The clamping force exerted by the clamping bolt on the cutting insert acts essentially parallel to the longitudinal clamping axis; essentially means herewith parallel and any deviation therefrom in the range of ±10° or less, preferably ±5° or less.

Preferably, the clamping bolt extends within the holder only along the longitudinal clamping axis, such that the clamping bolt does not bend within the holder. This allows to insert the clamping bolt into a straight, cylindrical bore of the holder which is easy to manufacture and allows for a collision-free rotation of the clamping bolt with respect to the holder.

Pre-strained and the like is to be understood to mean that the clamping bolt is under elastic tension, such that the cutting insert is pressed securely onto the holder. The clamping bolt thus acts like a spring pulling the cutting insert onto the holder.

The locking bolt can be removed from the clamping bolt, whereupon the clamping bolt can be removed from each of the holder and the cutting insert which allows to remove the cutting insert from the holder.

SUMMARY OF THE INVENTION

It is expressly stated that the inventive clamping device can contain the holder and/or the cutting insert, preferably both, in a preferred embodiment being ready to be used for a cutting tool operation.

According to a further embodiment of the inventive clamping device the clamping bolt contains a coolant channel configured to be in fluid communication with a coolant supply of the holder and configured to guide coolant from the coolant supply to a free-standing cutting edge of the cutting insert. Advantageously, the coolant channel can deliver coolant to the free-standing cutting edge, such that the free-standing cutting edge can be cooled; the coolant supply is comprised by the holder, preferably the coolant supply is configured and arranged internally within the holder, since this saves mounting space.

In that the clamping bolt is rotatable about the longitudinal clamping axis relative to each of the cutting insert and the clamping bolt, such that the clamping bolt wedge engages with the locking bolt during the clamping bolt rotation about the longitudinal clamping axis and such that the clamping bolt is kept pre-strained during the clamping bolt rotation, allows the coolant channel to be rotated jointly with the clamping bolt into a desired position. Coolant can then be delivered to different parts of the free-standing cutting edge following the degree of the clamping bolt rotation. For example, the coolant channel can be rotated to supply the part of the free-standing cutting edge positioned outside of the workpiece during a cutting tool operation, preferably a milling tool operation, with coolant. In other words, the coolant flow out of the clamping bolt is adaptable with respect to different cutting depths of the free-standing cutting edge.

Free-standing cutting edge is to be understood to mean that a cutting edge is positioned ready to cut the workpiece during milling. As such the free-standing cutting edge avoids contact with the holder. The free-standing cutting edge can be a part of a longer cutting edge. Further, the free-standing cutting edge can be straight or curved and can be inclined to descend from a high point to a low point.

The cutting insert is preferably an indexable cutting insert containing at least one further cutting edge which can be positioned to replace the free-standing cutting edge by rotating the cutting insert about the longitudinal clamping axis and/or by turning the cutting insert up-side down. The former requires that the clamping bolt is at least partially relaxed. The latter requires removal of the clamping bolt from the holder.

According to a further embodiment of the inventive clamping device the coolant channel is configured and arranged at least partly eccentric with respect to the longitudinal clamping axis, such that coolant can be directed from the clamping bolt into different directions out of the clamping bolt during the clamping bolt rotation. This makes the coolant supply from the clamping bolt adaptable to different cutting depths of the cutting insert, i.e. the coolant channel and thereby the clamping bolt can be rotated to direct coolant onto the part of the free-standing cutting edge protruding out of the workpiece during cutting, e.g. milling.

According to a further embodiment of the inventive clamping device the coolant channel is configured at least partly as an open recess. Advantageously, the open recess is easy to be manufactured by e.g. milling into the clamping bolt. Further, chip clogging can be easily removed from the coolant channel because the open recess is directly accessible once the clamping bolt is removed from the holder.

According to a further embodiment of the inventive clamping device the clamping bolt comprises a coolant flow direction marking indicating the direction of coolant flow out of the clamping bolt and being different from a coolant outlet. This makes it easier to know if the clamping bolt and thereby the coolant channel have been rotated into a desired coolant outlet position prior to cutting, e.g. milling. The coolant flow direction marking can have an arrow shape pointing along the direction of the coolant flow. The flow direction marking may comprise a relief (3D topography).

According to a further embodiment of the inventive clamping device the clamping bolt comprises an engagement recess configured and arranged to be engaged with a turning tool, such that the clamping bolt can be rotated by the turning tool about the longitudinal clamping axis while being wedge engaged with the locking bolt. Advantageously, the clamping bolt can be held by the engagement of the turning tool with the engagement recess in a desired rotational position with respect to the longitudinal clamping axis during an insertion of the locking bolt into the holder under contact with the clamping bolt. Further, the engagement recess can also be used to rotate the clamping bolt under the wedge engagement with the locking bolt into a desired rotational position with respect to the longitudinal clamping.

According to a further embodiment of the inventive clamping device the coolant flow direction marking is configured and arranged to be visible in a viewing direction parallel along the longitudinal clamping axis. Thus, the coolant flow direction marking can readily be seen from a top view onto clamping bolt, which makes it ergonomically convenient to identify where coolant flow out of the coolant channel is to occur (checking the coolant channel position in a side view is avoided).

According to a further embodiment of the inventive clamping device the engagement recess is u-shaped. The u-shaped is easy to be manufacturing by e.g. milling and allows for the turning tool slide into the engagement recess. Alternatively, the engagement recess may also be v-shaped which allows for a better alignment of the turning tool within the engagement recess.

According to a further embodiment of the inventive clamping device the clamping bolt contains a wedge body and a head body. The wedge body tapers along the longitudinal clamping axis towards the head body. The head body is configured for engagement with the cutting insert and wherein the clamping bolt rotation amounts to at least 45°. Advantageously, the pre-tension is kept constant during the clamping bolt rotation, i.e. the clamping bolt offers a smooth gliding path to slide relative to the locking bolt within said 45° rotation.

That the wedge body tapers along the longitudinal clamping axis towards the head body means that its cross-section, being oriented perpendicular to the longitudinal clamping axis, decreases towards the head body.

According to a further embodiment of the inventive clamping device the clamping bolt has a waisted shape. The waisted shape counteracts a stress concentration in the clamping bolt.

According to a further embodiment of the inventive clamping device the longitudinal clamping axis runs centrally through the clamping bolt, wherein a longitudinal locking axis runs longitudinally and centrally through the locking bolt, and wherein the longitudinal clamping axis is skewedly oriented with respect to the longitudinal locking axis. Thus, the clamping bolt and the locking bolt can be arranged L-shaped with respect to each other which creates mounting clearance within the holder (the locking bolt protrudes only partially into an e.g. bore of the holder into which the clamping bolt can be inserted, in case the longitudinal locking axis would cross the longitudinal clamping axis the clamping bolt would protrude further into said bore reducing the mounting clearance). Due to the skewed orientation, the locking bolt can slide laterally along the wedge body.

According to a further embodiment of the inventive clamping device the locking bolt contains a threaded section for a threaded engagement with the holder and wherein the locking bolt contains further a counter wedge body which can be moved into increasing wedge engagement with the wedge body by a locking movement of the locking bolt. The counter wedge body tapers in the direction of the locking movement and the counter wedge body wedge engages with the wedge body during the clamping bolt rotation. Advantageously, the wedge engagement between the counter wedge body and the wedge body allows to precisely adjust the pre-strain in the clamping bolt being. The counter wedge body can be a body of complete revolution about a longitudinal axis of the locking bolt and/or the wedge body can be a body of partial revolution by at least 45° about the longitudinal clamping axis; partial revolution about the longitudinal clamping axis means that the wedge body has an outer surface generated by rotating a line, which can be straight or curved, less than one complete rotation about the longitudinal clamping axis, e.g. at least an eighth, at least a quarter, at least a half or at least a three-quarter rotation each about the longitudinal clamping axis. Preferably the counter wedge body has an unthreaded design to avoid scratching the wedge body; scratchings are typically a source for stress concentrations. The counter wedge body can be a conical tip of the locking bolt, wherein the conical tip can be blunt, e.g. the conical tip is terminated by a plane top surface arranged perpendicular to the longitudinal locking axis. This design is easy to manufacture, i.e. costs are reduced, and adds further to avoid scratching the wedge body.

An inventive cutting tool contains a holder, a cutting insert and a clamping device according to any of the thereto pertaining claims and the disclosure thereof in the present description and the drawing. The clamping bolt is inserted into each of the holder and the cutting insert and wherein the locking bolt is inserted into the holder, such that the clamping bolt wedge engages with the locking bolt during a clamping bolt rotation about the longitudinal clamping axis and such that the clamping bolt is kept pre-strained during the clamping bolt rotation. Thereby the advantages disclosed for the inventive clamping device are realized likewise. Preferably, the cutting tool is a milling tool.

According to a further embodiment of the inventive cutting tool the holder comprises a coolant supply in fluid communication with the clamping bolt. Thus, the cutting insert can be supplied with coolant from the holder through the clamping bolt, preferably through the coolant channel, which can be rotated before, during and after coolant flow through the clamping bolt, i.e. an adjustable coolant supply is provided for.

According to a further embodiment of the inventive cutting tool the cutting tool is a milling tool. Mounting space is typically scarce in a milling tool, such that making use of the inventive clamping device having a compact design (the locking bolt can be positioned and operated under a range rotational positions of the clamping bolt) also increases the space for further cutting inserts comprised by the inventive cutting tool.

According to a further embodiment of the inventive cutting tool a milling rotation axis runs longitudinally through the holder, wherein the holder contains a mounting recess into which the cutting insert is clamped and wherein the mounting recess has a support surface intersected by the clamping bolt and wherein the support surface is a leading surface for rotation of the holder about the milling rotation axis. Thus, a milling tool design is provided for, wherein a compact clamping mechanism as disclosed herein saves mounting space in a tangential direction with respect to the milling rotation axis allowing to increase the number of further cutting inserts.

Other features which are considered as characteristic for the invention are set forth in the appended claims.

Although the invention is illustrated and described herein as embodied in a clamping device and a cutting tool, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
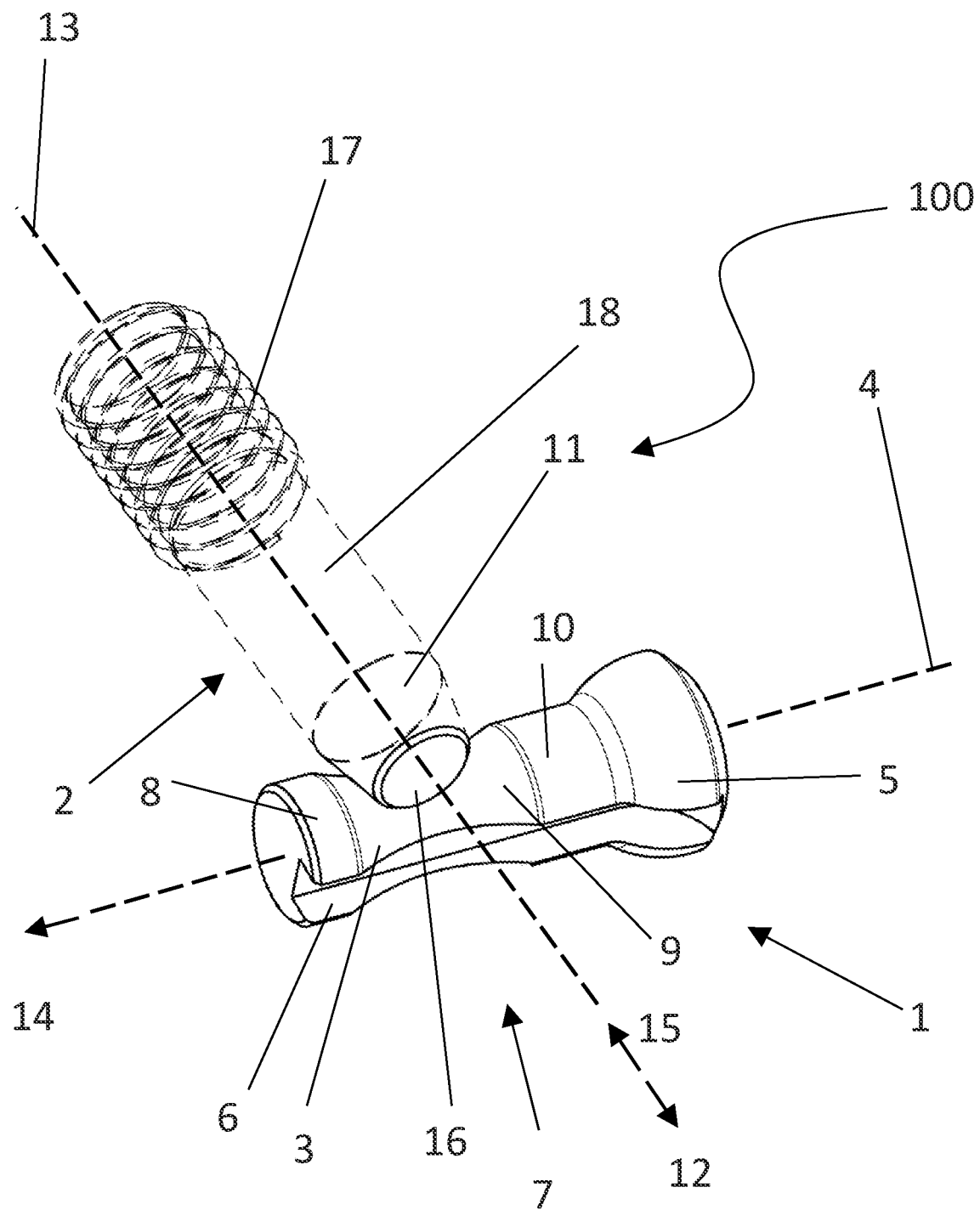
FIG. 1 is a diagrammatic, perspective view of an embodiment of the inventive clamping device.

Referring now to the figures of the drawings in detail and first, particularly to FIG. 1 thereof, there is shown a pre-strained clamping bolt 1 wedge engaged with a locking bolt 2 in a perspective view. The clamping bolt 1 and the locking bolt 2 are each comprised by an embodiment of an inventive clamping device 100.

Figure 4:
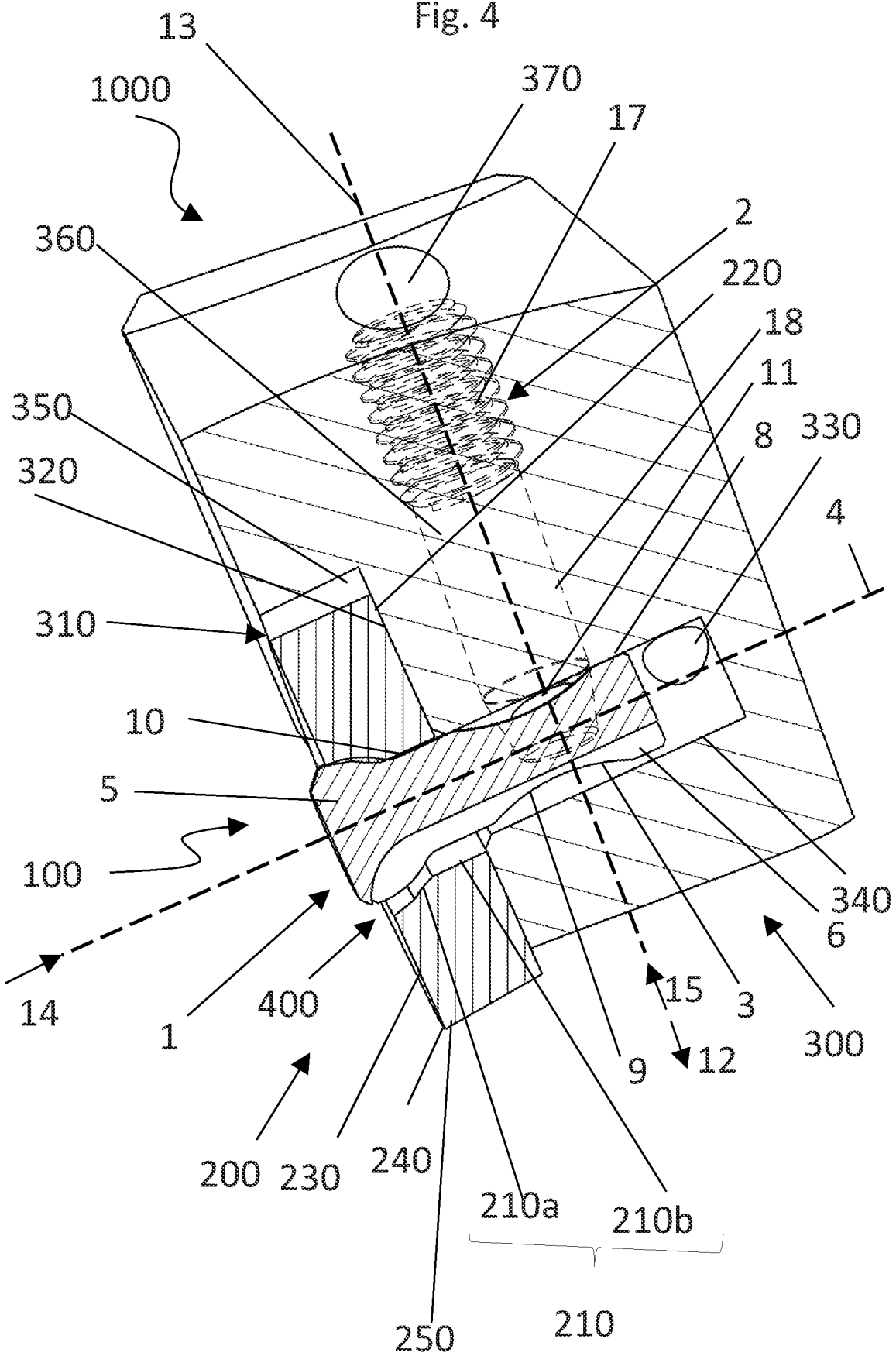
FIG. 4 is a cross-sectional view through an embodiment of the inventive cutting tool.

The clamping bolt 1 contains a wedge body 3 which tapers parallel along a longitudinal clamping axis 4 towards a head body 5 of the clamping bolt 1; the longitudinal clamping axis 4 runs centrally through the clamping bolt 1 and the wedge engagement with the locking bolt 2 is realized on parts of the clamping bolt 1 by the wedge body 3; the head body 5 is engaged with a cutting insert 200 as can be seen in FIG. 4.

The wedge body 3 is a body of partial revolution about the longitudinal clamping axis 4; in absence of a coolant channel 6 of the clamping bolt 1, running eccentric to the longitudinal clamping axis 4, the wedge body 3 could circumferentially continue to become a complete body of revolution about the longitudinal clamping axis 4.

The wedge body 3 is part of a shaft 7 of the clamping bolt 1 which is divided into a cylindrical end body 8 arranged farthest away from the head body 5, the wedge body 3 arranged closer to the head body 5 than the cylindrical end body 8, a transition body 9 tapering oppositely to the wedge body 3, i.e. away from the head body 5, and arranged closer to the head body 5 than the wedge body 3 and a cylindrical top body 10 arranged closest to the head body 5. Each of the cylindrical end body 8, the transition body 9, the cylindrical top body 10 and the head body 5 are bodies of partial revolution about the longitudinal clamping axis 4 to an extent like the wedge body 3. This uniform design of each of the parts of the shaft 7 and the head body 5 allows to manufacture the clamping bolt 1 in two steps. The first step is turning a raw body of the clamping bolt 1 under chip formation to a uniform body of complete revolution about the longitudinal clamping axis 4. The second step is milling the coolant channel 6 under chip formation into the uniform body of complete revolution.

The clamping bolt 1 has a waisted design due to that the transition body 9 tapers oppositely to the wedge body 3. In other words, there exists a smallest cross-section of the clamping bolt 1 oriented perpendicular to the longitudinal clamping axis 4 between the cylindrical end body 8 and the head body 5. The waisted design reduces clamping stresses in the clamping bolt 1.

The coolant channel 6 has a u-shaped open cross-section in a viewing direction parallel to the longitudinal clamping axis 4 and is designed as an open recess.

Further, the coolant channel 6 is configured and arranged to guide coolant parallel along the longitudinal clamping axis 4 on parts of the cylindrical end body 8, the wedge body 3, the transition body 9 and the cylindrical top body 10. On parts of the head body 5 coolant is then guided by the coolant channel 6 along a curved path away from the longitudinal clamping axis 4 out of the clamping bolt 1.

The locking bolt 2 has a counter wedge body 11 tapering in a locking direction 12 arranged parallel along a central displacement axis 13 of the locking bolt 2; the central displacement axis 13 being a longitudinal axis of the locking bolt 2. If the locking bolt 2 is moved relative to the clamping bolt 1 parallel along the central displacement axis 13, which runs longitudinally through the locking bolt 2, in the locking direction 12 and under mutual contact between the counter wedge body 11 and the wedge body 3, the clamping bolt 1 is increasingly strained in a clamping direction 14 arranged parallel along the longitudinal clamping axis 4 away from the head body 5. Conversely, if the locking bolt 2 is moved relative to the clamping bolt 1 parallel along the central displacement axis 13 in an unlocking direction 15, arranged parallel along the central displacement axis 13 and oppositely to the locking direction 12, and under mutual contact between the counter wedge body 11 and the wedge body 3, the clamping bolt 1 is decreasingly strained (the locking bolt 2 can also be removed completely from the clamping bolt 1, the clamping bolt 1 is then completely relaxed).

The counter wedge body 11 is a body of complete revolution about the central displacement axis 13 and forms a tip of the locking bolt 2 which is terminated by a plane terminal surface 16, which is arranged in a viewing direction parallel along the central displacement axis 13 outside of the wedge body 3.

Figure 2:
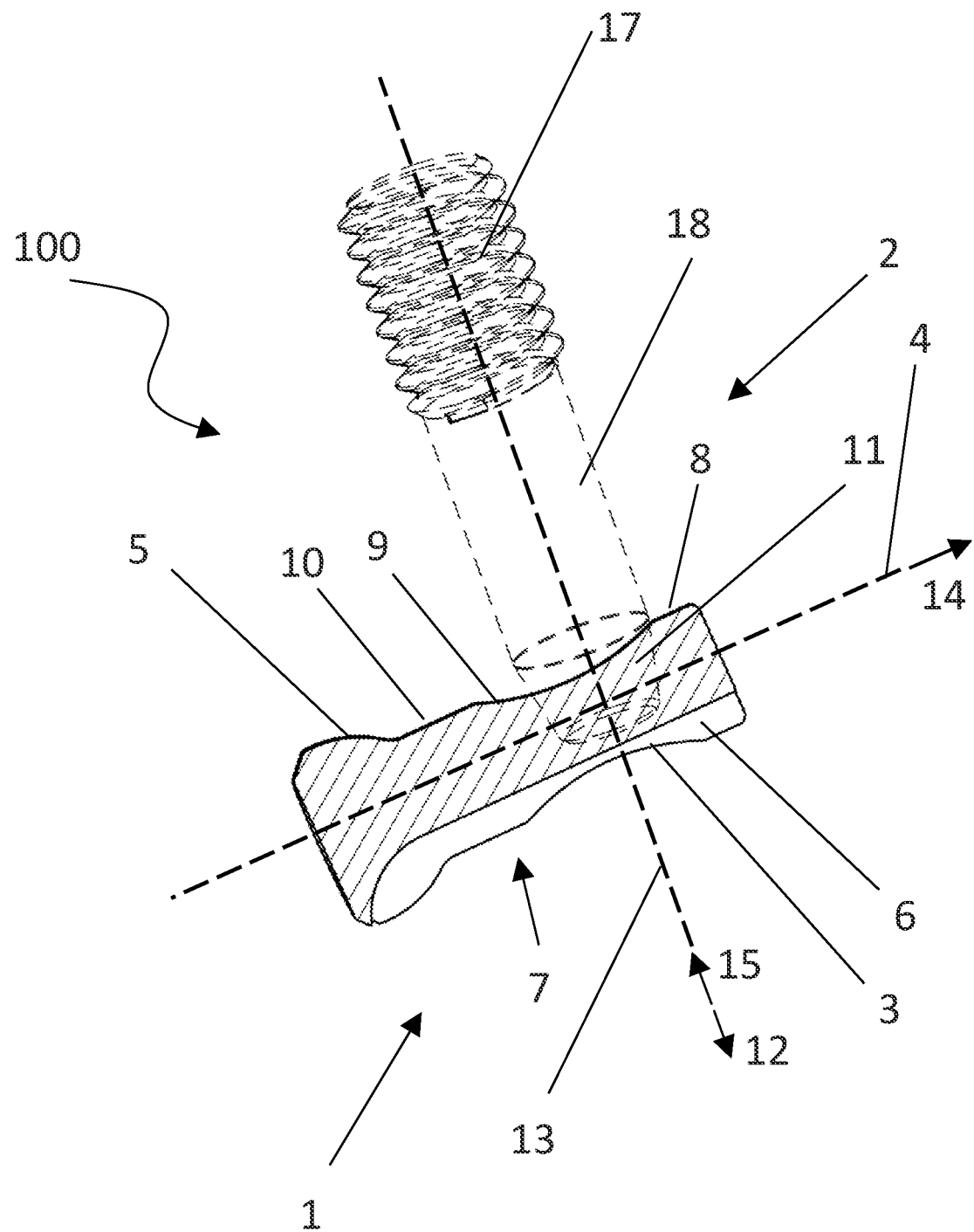
FIG. 2 is a cross-sectional view through the embodiment from FIG. 1.

For a given wedge engagement of the counter wedge body 11 with the wedge body 3, as depicted in FIGS. 1, 2 and 4, the wedge body 3 and thereby the entire clamping bolt 1 can be rotated about the longitudinal clamping axis 4, that is a clamping bolt rotation, to the extent the rotational symmetry of the wedge body 3 is reached. Under the clamping bolt rotation the clamping bolt 1 is kept pre-strained by the locking bolt 2 (the locking bolt 2 stands still relative to the clamping 1 during the clamping bolt rotation) and the coolant channel 6 is rotated likewise. In other words, pre-straining the clamping bolt 1 is decoupled from the clamping bolt rotation.

The locking bolt 2 can be moved parallel along the central displacement axis 13 by rotating the locking bolt 2 about the central displacement axis 13 since a threaded body 17 of the locking bolt 2 is engaged with a holder 300 to which further reference will be made in FIG. 4. In other words, the rotation of the locking bolt 2 is transformed into a linear motion parallel along the central displacement axis 13, depending on the sense of rotation the locking bolt 2 is moved in the locking direction 12 or the unlocking direction 15, respectively. The engagement of the threaded body 17 with the holder 300 provides for a self-locking of the locking bolt 2 in absence of an exteriorly activated rotation of the locking bolt 2 (the threaded body 17 interlocks the locking bolt 2 with the holder 300).

The locking bolt 2 comprises a cylindrical body 18 arranged between the counter wedge body 11 and the threaded body 17 thereby preventing that the threaded body 17 comes into contact with the wedge body 3 (the threaded body 17 bears the risks of scratching the wedge body 3 under mutual contact).

As it can be seen further in FIG. 1, the longitudinal clamping axis 4 and the central displacement axis 13 are arranged skewedly with respect to each other (not crossing each other and not being parallel to each other). The counter wedge body 11 can thus slide laterally along the wedge body 3. In other words, the wedge body 3 is arranged outside of terminal abutment with respect to moving the locking bolt 2 in the locking direction 12.

FIG. 2 shows the clamping bolt 1 wedge engaged with the locking bolt 2 in a cross-section through the clamping bolt 1; the cross-section contains the longitudinal clamping axis 4, the locking bolt 2 is drawn transparent. FIG. 2 reveals that the coolant channel 6 extends from and through the cylindrical end body 8 through the wedge body 3, through the cylindrical top body 10 and through the head body 5. The clamping axis 4, running centrally through the clamping bolt 1, is arranged outside of the coolant channel 6. In other words, the coolant channel 6, being configured as an open recess, is arranged eccentric with respect to the longitudinal clamping axis 4.

Figure 3:
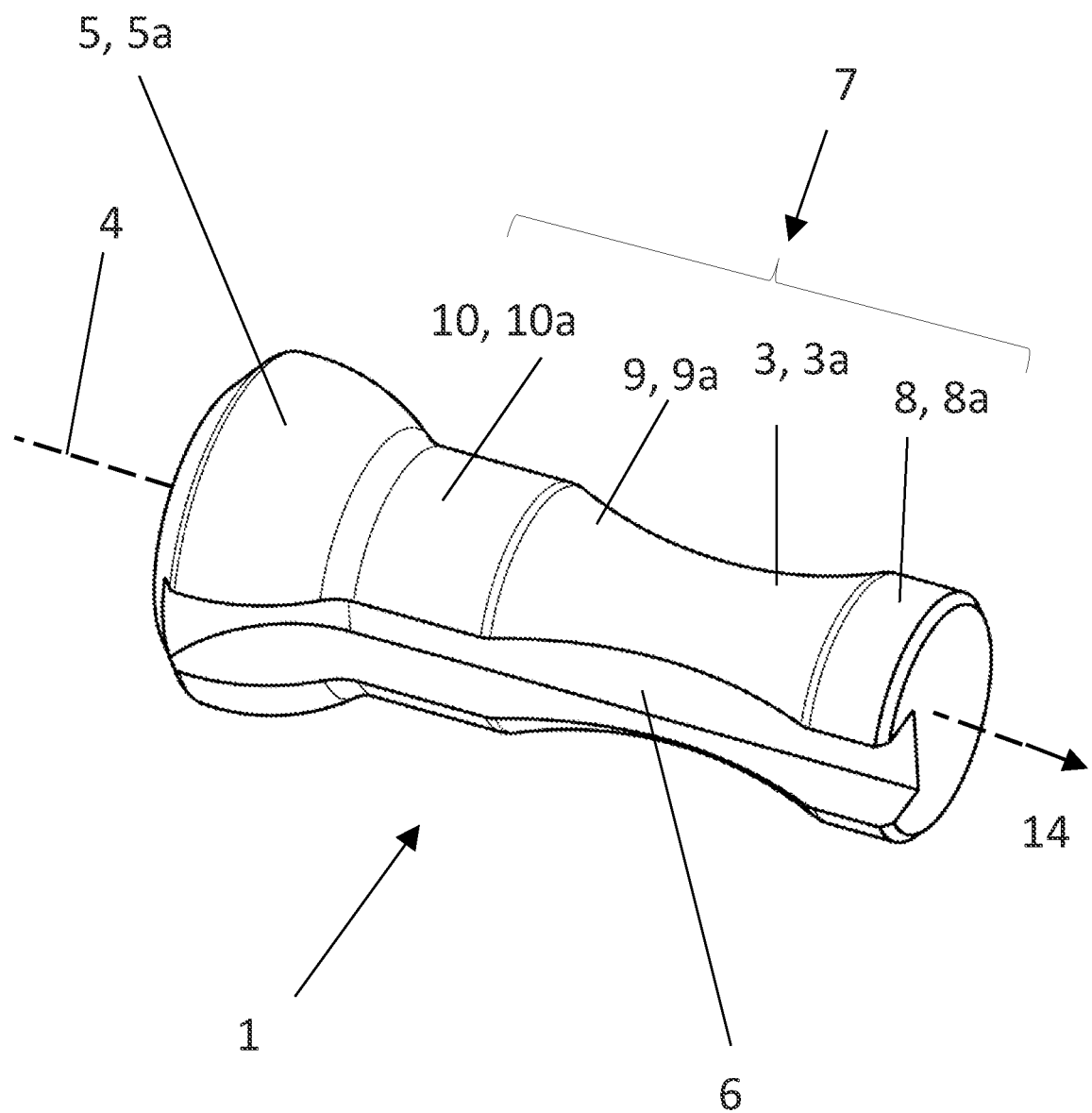
FIG. 3 is a perspective view of the clamping bolt of the embodiment from FIG. 1.

FIG. 3 shows the clamping bolt 1 in a perspective view without the locking bolt 2. It can be seen from FIG. 3 in further detail, that the cylindrical end body 8 has an outer surface 8a, that the wedge body 3 has an outer surface 3a, that the transition body 9 has an outer surface 9a and that the cylindrical top body 10 has an outer surface 10a. The outer surface 3a is in contact with the counter wedge body 11 in the clamping situation depicted in FIGS. 1 and 2. The outer surface 10a is in contact with the cutting insert 200 to which further reference will be made in FIG. 4. It is highlighted in FIG. 3, by using a parenthesis, that the shaft 7 comprises the cylindrical end body 8, the wedge body 3, the transition body 9 and the cylindrical top body 10.

FIG. 3 shows further that the clamping bolt 1 has a straight design, meaning that it extends along the (straight) longitudinal clamping axis 4, i.e. the clamping bolt 1 does not bend away from the longitudinal clamping axis 4. This reduces mounting space in the inventive milling tool 1000, allows to insert the clamping bolt 1 into a correspondingly straight bore and enables for a collision-free rotation of the clamping bolt 1 with the remainder of the milling tool 1000.

The wedge body 3 is a body of 270° revolution about the longitudinal clamping axis 4, though modifications therefrom are feasible.

FIG. 4 shows a cross-section through an embodiment of an inventive milling tool 1000, which is a cutting tool, containing the clamping device 100 (the cross-section contains the longitudinal clamping axis 4). As can be seen from FIG. 4, the clamping bolt 1 clamps the cutting insert 200 onto the holder 300 of the milling tool 1000. Specifically, the head body 5 is engaged with an upper part 210a of a central through bore 210 of the cutting insert 200. The upper part 210a is shaped to receive the head body 5. A lower part 210b of the central bore 200 is shaped to receive the cylindrical top body 10.

The cutting insert 200, which is configured indexable sits in an insert receiving pocket 310 of the holder 300. A bottom side 220 of the cutting insert 200 is engaged with a support side 320 of the holder 300. Opposite to the bottom side 220 the cutting insert 200 has a top side 230 bordered by a free-standing cutting edge 240 (the free-standing cutting edge 240 avoids contact with the holder 300 and is positioned ready to cut). The top side 230 and the bottom side 220 are joined to each other by a circumferential side 250 of the cutting insert 200.

The coolant channel 6 is in fluid communication with an internal coolant channel 330 of the holder 300, such that coolant leaving the coolant channel 330 enters the coolant channel 6 and leaves the coolant channel 6 through an outlet opening 400 formed jointly by the head body 5 and the top side 230 to flow along the top side 230 towards the free-standing cutting edge 240.

The clamping bolt 1 can be rotated about the longitudinal clamping axis 4, such that a coolant flow out of the coolant outlet opening 400 can be directed onto different parts of the free-standing cutting edge 240 (the free-standing cutting edge 240 extends out of the drawing plane of FIG. 4 and as such the coolant channel 6 can be rotated to direct coolant through the coolant outlet 400 out of the drawing plane, i.e. the coolant flow can be directed to follow the course of the free-standing cutting edge 240).

The clamping bolt 1 is also inserted into a mounting bore 340 of the holder 300. The central through bore 210 is offset to the mounting bore 340. Since the circumferential side 250 abuts against a side wall 350 of the insert pocket 310 prior to the clamping by the clamping bolt 1, the offset causes that the circumferential side 250 is clamped against the side wall 350, i.e. in a direction perpendicular to the longitudinal clamping axis 4.

The locking bolt 2 is inserted into a locking bolt receiving bore 360 through an insertion hole 370 of the holder 300. Within the locking bolt receiving bore 360 the locking bolt 2 is threadedly engaged by its threaded body 17 with the locking bolt receiving bore 360, thereby the locking bolt 1 is interlocked with the holder 300.

The top side 230 is a leading side of the cutting insert 200 during a rotation of the milling tool 1000 about a milling rotation axis being oriented perpendicular to the drawing plane of FIG. 4.

The milling tool 1000 may also be configured differently as disclosed in FIG. 4, especially modifications may be made within the scope of the appended claims and the description.

Figure 5:
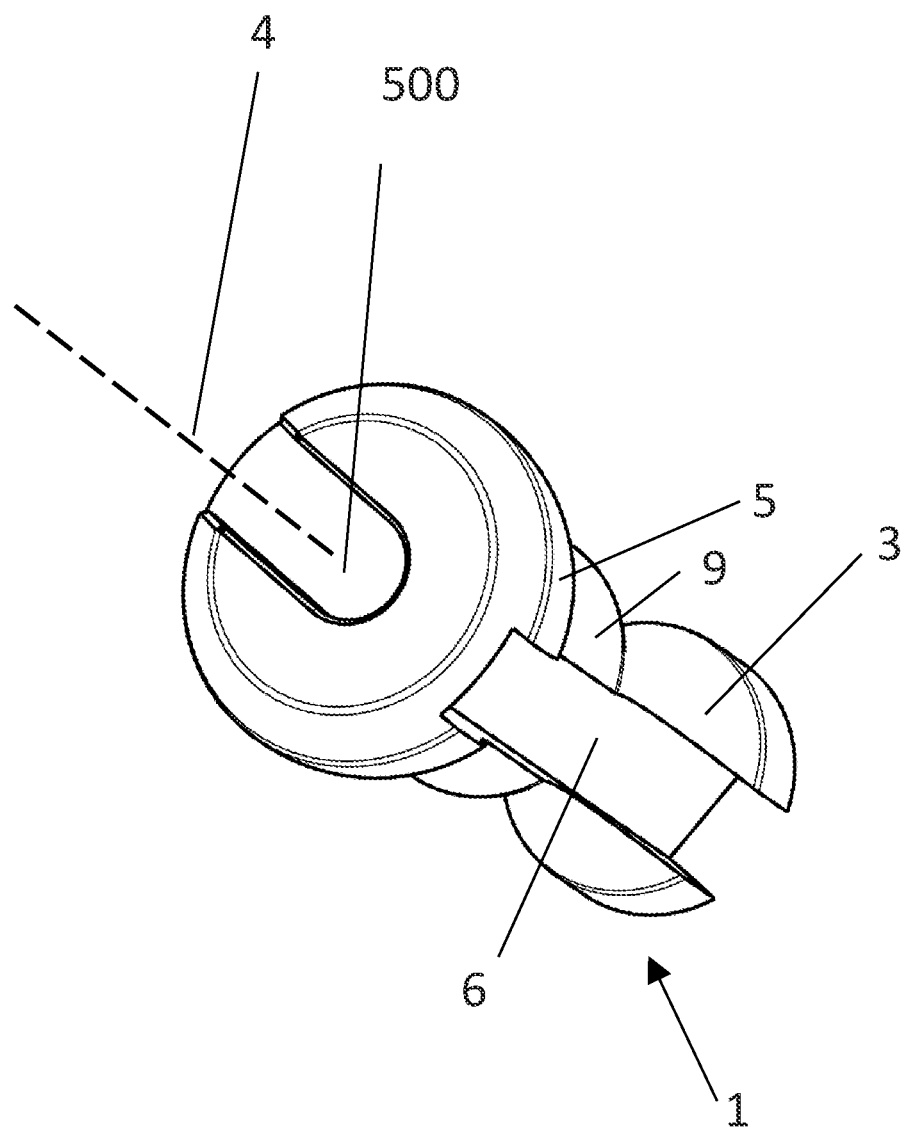
FIG. 5 is a further perspective view of the clamping bolt of the embodiment from FIG. 1.

FIG. 5 shows that the head body 5 of the clamping bolt 1 can comprise optionally an engagement recess 500, such that a turning tool, e.g. a screwdriver, can be inserted into the engagement recess 500, such that the clamping bolt 1 is be held by the engagement of the turning tool with the engagement recess 500 in a desired rotational position, e.g. the position shown in FIG. 4, with respect to the longitudinal clamping axis 4 during an insertion of the locking bolt 2 into the holder 300 under contact with the clamping bolt 1. Further, the engagement recess 500 can also be used to rotate the clamping bolt 1 under the wedge engagement with the locking bolt 2 into a desired rotational position with respect to the longitudinal clamping axis 4.

The clamping device 100 may also be configured differently as disclosed in FIGS. 1 to 5, especially modifications may be made within the scope of the appended claims and the description. Especially, the clamping device 100 may also be designed with a coolant channel different from the coolant 6 or without any coolant channel. In the latter case the clamping function of the clamping device 100 is still maintained with the advantages and embodiments disclosed thereto.

The invention claimed is:

1. A clamping device for clamping a cutting insert onto a holder of a cutting tool, the clamping device comprising:
   a clamping bolt being inserted into the cutting insert and the holder;
   a locking bolt being inserted into the holder, such that said locking bolt pre-strains said clamping bolt into clamping the cutting insert onto the holder, said clamping bolt being configured rotatable about a longitudinal clamping axis of said clamping bolt relative to each of the cutting insert and said locking bolt, such that said clamping bolt wedge engages with said locking bolt during a clamping bolt rotation about the longitudinal clamping axis and such that said clamping bolt is kept pre-strained during the clamping bolt rotation;
   said clamping bolt including a coolant channel formed therein and configured to be in fluid communication with a coolant supply of the holder and configured to guide coolant from the coolant supply to a free-standing cutting edge of the cutting insert; and
   said clamping bolt containing a wedge body and a head body, said wedge body tapering along the longitudinal clamping axis towards said head body, said head body configured for engagement with the cutting insert, and said clamping bolt rotation amounting to at least 45°.

2. The clamping device according to claim 1, wherein said coolant channel is configured and disposed at least partly eccentric with respect to the longitudinal clamping axis, such that the coolant can be directed from said clamping bolt into different directions out of said clamping bolt during the clamping bolt rotation.

3. The clamping device according to claim 1, wherein said coolant channel is configured at least partly as an open recess.

4. The clamping device according to claim 1, wherein said clamping bolt contains a coolant flow direction marking indicating a direction of coolant flow out of said clamping bolt and being different from a coolant outlet.

5. The clamping device according to claim 1, wherein said clamping bolt has an engagement recess formed therein and configured and disposed to be engaged with a turning tool, such that said clamping bolt is rotated by the turning tool about the longitudinal clamping axis while being wedge engaged with said locking bolt.

6. The clamping device according to claim 5, wherein said engagement recess is u-shaped.

7. The clamping device according to claim 1, wherein said clamping bolt has a waisted shape.

8. The clamping device according to claim 1, wherein:
   said locking bolt contains a threaded section for a threaded engagement with the holder;
   said locking bolt contains further a counter wedge body which is moved into increasing wedge engagement with said wedge body by a locking movement of said locking bolt;
   said counter wedge body tapers in a direction of the locking movement; and
   said counter wedge body engages with said wedge body during the clamping bolt rotation.

9. A clamping device for clamping a cutting insert onto a holder of a cutting tool, the clamping device comprising:
   a clamping bolt being inserted into the cutting insert and the holder;
   a locking bolt being inserted into the holder, such that said locking bolt pre-strains said clamping bolt into clamping the cutting insert onto the holder, said clamping bolt being configured rotatable about a longitudinal clamping axis of said clamping bolt relative to each of the cutting insert and said locking bolt, such that said clamping bolt wedge engages with said locking bolt during a clamping bolt rotation about the longitudinal clamping axis and such that said clamping bolt is kept pre-strained during the clamping bolt rotation;
   said clamping bolt including a coolant channel formed therein and configured to be in fluid communication with a coolant supply of the holder and configured to guide coolant from the coolant supply to a free-standing cutting edge of the cutting insert;
   the longitudinal clamping axis running centrally through said clamping bolt;

a longitudinal locking axis running longitudinally and centrally through said locking bolt; and the longitudinal clamping axis being skewedly oriented with respect to the longitudinal locking axis.

10. A milling tool, comprising:

a holder;

a cutting insert; and a clamping device for clamping the cutting insert onto the holder of the milling tool, the clamping device comprising:

a clamping bolt being inserted into the cutting insert and the holder;

a locking bolt being inserted into the holder, such that said locking bolt pre-strains said clamping bolt into clamping the cutting insert onto the holder, said clamping bolt being configured rotatable about a longitudinal clamping axis of said clamping bolt relative to each of the cutting insert and said locking bolt, such that said clamping bolt wedge engages with said locking bolt during a clamping bolt rotation about the longitudinal clamping axis and such that said clamping bolt is kept pre-strained during the clamping bolt rotation; and said clamping bolt including a coolant channel formed therein and configured to be in fluid communication with a coolant supply of the holder and configured to guide coolant from the coolant supply to a free-standing cutting edge of the cutting insert; and said clamping bolt being inserted into said holder and said cutting insert, and said locking bolt being inserted into said holder, such that said clamping bolt wedge engages with said locking bolt during the clamping bolt rotation about the longitudinal clamping axis and such that said clamping bolt is kept pre-strained during the clamping bolt rotation.

11. The milling tool according to claim 10, wherein said holder contains a coolant supply in fluid communication with said clamping bolt.

12. The milling tool according to claim 10, wherein:

a milling rotation axis runs longitudinally through said holder; and said holder has a mounting recess formed therein and into which said cutting insert is clamped, said mounting recess has a support surface intersected by said clamping bolt and said support surface is a leading surface for rotation of said holder about the milling rotation axis.

* * * * *